United States Patent Office 3,772,427
Patented Nov. 13, 1973

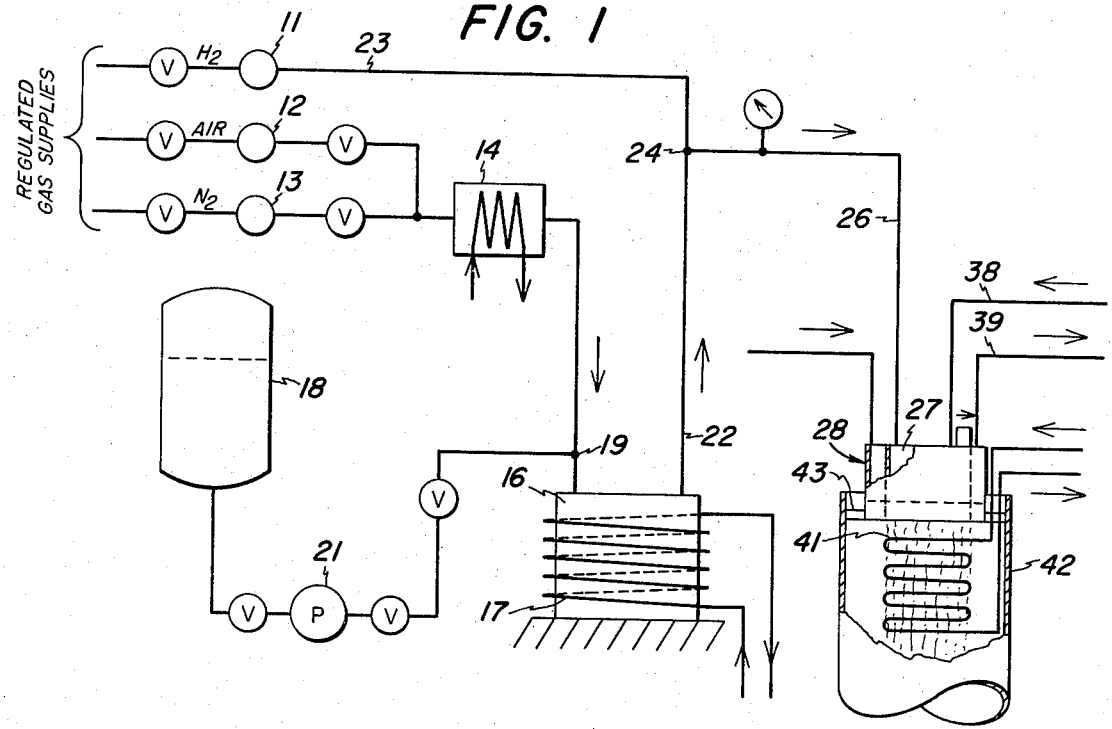
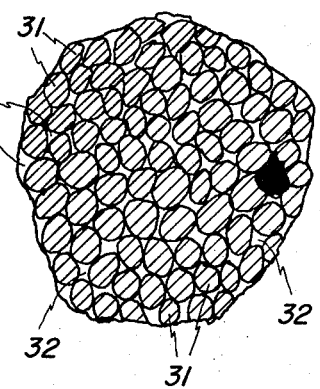
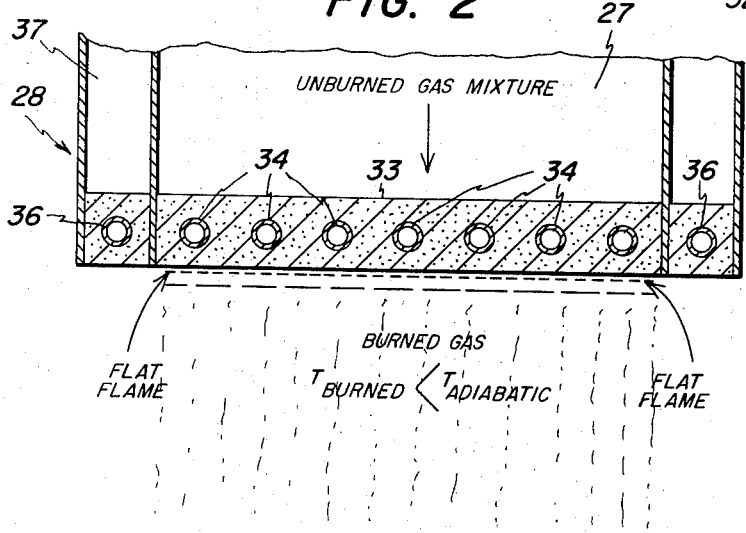

3,772,427
COMBUSTION PROCESS FOR PRODUCING HIGH SURFACE AREA SILICA
George E. Moore, Scotia, N.Y., assignor to General Electric Company
Original application July 15, 1969, Ser. No. 841,708. Divided and this application June 14, 1971, Ser. No. 152,707
Int. Cl. C01b 7/08, 33/18
U.S. Cl. 423—337         5 Claims

ABSTRACT OF THE DISCLOSURE

A cooled porous plug burner is used to produce and control the temperature of non-adiabatic flames of premixed hydrogen/air/halosilane gas mixture. The process can be conducted as either a continuous or batch operation.

BACKGROUND OF THE INVENTION

This is a division of U.S. patent application Ser. No. 841,708—Moore filed July 15, 1969 and assigned to the assignee of the instant invention.

Finely divided, or "fumed," silica has been prepared commercially by combustion processes. In one process $SiCl_4$, is hydrolyzed in the combustion products of a flame, usually of hydrogen premixed with air. In another process silicon halides or halosilanes are burned in flames such as those mentioned above. When produced with sufficiently high specific area, such silica is used as a filler in compounding rubber during manufacture.

The production of silica with the requisite high specific surface area depends in large part on maintaining control over the temperature of the silica as it precipitates from the hot gas and, as well, on the residence time of the silica at high temperatures. Unfortunately, when premixed flames (e.g. a $H_2/air/SiCl_4$ mixture nearly stoichiometric with respect to both $O_2$ and $SiCl_4$ consumption) are to be used, the adiabatic flame temperatures are around 2000° C. At such high temperatures the particle size becomes too large and sintering of the particles occurs. Each of these occurrences, of course, reduces the surface area of the silica product.

One solution to the problem is to minimize high temperature exposure by cooling the flame and rapidly cooling the primary stoichiometric flame by rapid dilution thereof with excess air, or other such diluent. However, the control and reproducibility of such a process are difficult and the selection of a proper burner construction lacks predictability. Further, the added diluent gas greatly increases the volume of gas to be handled during collection of the silica product, which is highly dispersed even under conditions of undiluted operation.

The art is, therefore, in need of an improved process (without resort to flame dilution) for the preparation of finely divided silica employing premixed flames such that, regardless of the stoichiometry of the flame, a preselected controlled temperature can never be exceeded.

SUMMARY OF THE INVENTION

The above aim has been met by the instant invention, the desired improvement being made possible by the use of a cooled porous plug burner by which heat is removed from the system on the unburned gas side of the flame, rather than from the already burned gas.

The premixed reactants are fed to a porous sintered metal plug burner at a flow velocity reduced much below the normal burning velocity of the reactant mixture. Upon ignition, a flame propagates to the surface of the plug burner and there stabilizes as a flat sheet spread thereover. Heat is transferred from the combustion process to the burner, which heat is removed from the interior of the burner by a coolant with the result that the temperature of the flame is reduced below the adiabatic value.

In addition to achieving the improvement desired by the art, the use of a porous plug burner for the purpose set forth herein provides additional advantages in that the burner (a) acts as its own flame arrester and (b) provides a uniform flow over the burner surface such that the burned gas will have had substantially the same history along all flow paths.

BRIEF DESCRIPTION OF THE DRAWING

The exact nature of this invention as well as other objects and advantages thereof will be readily apparent from consideration of the following specification relating to the annexed drawing in which:

FIG. 1 is a schematic representation of an apparatus employed in the practice of the instant invention;

FIG. 2 is an elevational view showing in section a porous plug burner as employed in the practice of this invention; and FIG. 3 is a magnified view of a portion of the body of a porous plug burner used in the practice of this invention.

DESCRIPTION OF THE PREFERRED EMBODIMENT

As is shown in FIG. 1, gases used in the process pass from suitable sources (not shown) through metered flow regulators 11, 12, 13 or similar flow control devices. One of the gas flows (usually the air) is passed through heat exchanger 14 for heating thereof to a temperature of about 60° C. All gas flows should be dry or substantially so. Thereafter the heated air flow passes to boiler 16 about which is wound the heating coil 17 through which is circulated hot water at a temperature of about 65° C. The silicon-source material, e.g. a halosilane, present as a liquid in holding tank 18 is pumped to T-connection 19 via metering pump 21. Air flow from heat exchanger 14 to boiler 16 passes through T-connection 19 entraining the silicon-source material, carrying it into boiler 16, which is kept hot enough to flash the silicon-source material into the vapor state. Thereupon this vapor merges with the air as an outgoing gas stream leaving boiler 16 via pipe 22. Mixing of the air and vapor may be promoted by the use of baffles (not shown) in the boiler. The partial pressure of the silicon-source vapor in this outgoing gas stream is kept at, or below, such a value that no condensation of the silicon-source vapor can occur downstream. The gas stream flow in pipe 22 mixes with the hydrogen gas flow from pipe 23 to T 24 to pass as a mixed flow via pipe 26 to inlet chamber 27 to burner 28.

In the arrangement shown in FIGS. 1 and 2 burner 28 has been mounted in the inverted position to facilitate collection of the product. The burner may be used in the upright position, if desired.

By way of example, porous plug burner 28 is made of sintered metal, preferably copper particles in the size range from about 1 to about 200 microns. Greater uniformity of flow of the gas to the flame can be achieved by employing as the flame surface of burner 28 a thin sintered (porous) bronze plate, which is sintered to the copper covered thereby. The illustration in FIG. 3 shows the general relationship of the sintered metal particles 31 and interconnected voids 32 permitting continuous passage of the incoming gas mixture through the porous body 33 of burner 28 with a pressure drop of less than 1 p.s.i. for a burner body having a thickness of about ⅝". The pressure drop will vary as a function of the velocity of the unburned gas introduced thereto. For plug burners ½" thick, the pressure drop is about 0.03 p.s.i./cm./sec. of gas flowing under a pressure of about 1 atmosphere. For this application other metals may be employed in place of copper, for example, bronze shot or nickel shot. Actually, any structurally sound shot material having a thermal conductivity at least 5% of the value of the thermal conductivity of copper shot should be useable.

Cooled porous plug units such as are described in FIGS. 2 and 3 have been produced from masses of oxygen-free copper particles with cooling means, e.g. spiral cooling coil 34 (and separate single-pass circular tube 36 shown connected in series flow therewith) embedded therein. The cooling means and copper particles are placed in a graphite mold and a thin (about 0.1 inch thick) sintered bronze plate is placed thereon. The assembly is then sintered, while applying a small pressure (less than about 2 p.s.i.) thereto. The extent of pressure application determines the void content and, therefore, the strength of the sintered porous body. However, the most important aspect of void content control is the introduction of low flow resistance and reasonably high thermal conductivity to the body 33. The arrangement shown of the cooling means 34 and 36 does not provide for separate control over cooling of the main, or central, portion of body 33 (which is in flow communication with burner chamber 27) and the outer rim portion of body 33 (which is in flow communication with annular chamber 37). However, this may be accomplished by providing for separate, rather than series, flow to cooling means 34 and 36. Annular chamber 37 may be used for the establishment of an annular flow of air or inert gas as a confining "curtain" around the burned gas or a combustible gas mixture may be admitted thereto to function either as a continuous pilot for lifted adiabatic flames or as a starting pilot light. Although stainless steel is preferred as a construction material, brass, copper or polyethylene may be used for various parts of the apparatus.

In the practice of this invention it is preferable that the system be purged either with nitrogen or dry air both before and after each use. A small flow of dry air should be maintained through burner 28, when not in use to minimize the introduction of moisture to the system.

The condensation of water on the burner surface is avoided by employing water at a temperature of about 60° C. as the coolant circulated through conduits 38, 39.

In essence the sequence recited above accomplishes the introduction and thorough mixing of a silicon-source halide (preferably a halosilane decomposed by water generated in the combustion process) with an explosive gas mixture in quantities sufficient to consume most or all of the water formed during combustion of the explosive mixture. The overall stoichiometry for the process using $SiCl_4$ may be expressed as follows:

(1)

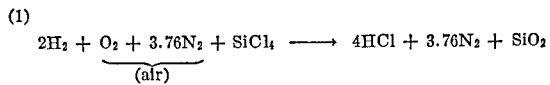

$$2H_2 + \underbrace{O_2 + 3.76N_2}_{(air)} + SiCl_4 \longrightarrow 4HCl + 3.76N_2 + SiO_2$$

Any excess air will simply appear on the product side of Equation 1 and may slightly modify the gas composition but not in any manner material to this invention. The significant fact is that, while such a mixture will have an adiabatic flame temperature of around 2000° C., combustion on the cooled porous plug 28 with the unburned gas velocity ranging from about 3 to about 10 centimeters per second will yield a burned gas having a maximum temperature in the range of from about 1000 to 1200° C., depending on the velocity. In those instances in which the surface area of the silica produced need not be greater than about 300 square meters/gm. higher unburned gas velocities with accompanying higher temperature can be tolerated.

In a typical operation of the burner 28 an external annulus of air flow continually exits at low velocity along the rim of plug body 33 confining the downwardly extending silica smoke column as it passes over cooling helix 41 to aid in agglomeration and collection of the silica product.

In a typical sequence of operation the desired air flows are established in both the center of burner 28 and the annulus thereof while burner 28 is positioned above the rim of collection column 42. Thereafter, natural gas is added to the air passing to chamber 37 and that mixture is lit and adjusted to produce a flat ring-shaped blue flame (the velocity of which is about 10-20 cm./sec., a value below the normal burning velocity). This flame then serves as a pilot for lighting the main flame. Hydrogen is then added to the air admitted to chamber 27 and the flow thereof is adjusted. Determination of whether the colorless $H_2$/air flame is burning may be made by holding a platinum wire in the flame region adjacent the flat surface of burner 28.

For the usual non-adiabatic or flat-flame operation, the natural gas to the annulus is then shut off, but the annulus air is left on. The centrally disposed $H_2$/air flame continues for a few minutes warming up the collection apparatus to a steady state and evaporating any condensate. The burner is then lowered to about 1 cm. below the open top of the collection column 42, where it is held on spaced projections 43, and the exhaust system not shown is adjusted.

Chlorosilane is then admitted at the desired flow rate being added to the $H_2$/air flow as described hereinabove. In approximately one minute chlorosilane vapor reaches the flame. Thereupon silica smoke immediately appears uniformly distributed in the burned gas.

With the chlorosilane being admitted as part of the unburned gas mixture a flat flame results disposed substantially uniformly over the surface of burner body 33 within the annulus of air flow. This flame extends less than one millimeter from the surface of burner body 33. Beyond the flame a space exists for about 2 millimeters between the flame and the visible smoke particles as they precipitate from the burned gas.

On shut down, the chlorosilane flow is stopped, and the lines containing it are purged; the $H_2$ flow is then shut off and the burner air reduced to a low level. After the collection apparatus 42 has cooled sufficiently, the exhaust system is shut off and the product removed.

Care must be taken with the exhaust gases, of course, to properly dispose of the HCl formed in the process by, for example, passing the exhaust gases through absorbing means.

When trichlorosilane is used as a silicon-source, the stoichiometry adjusts as follows:

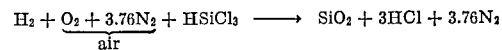

$$H_2 + \underbrace{O_2 + 3.76N_2}_{air} + HSiCl_3 \longrightarrow SiO_2 + 3HCl + 3.76N_2$$

The temperature of the combustion products from the porous plug burner are slightly lower than would be the case with $SiCl_4$ at the same flow velocity. In both cases the chlorine gas content of the product gases is very small.

The product material, which amounts to about 20 weight percent of the product gas, is essentially an aerosol, the particles of which closely resemble those of soot in size and form. Typically, each such particle is an assembly of spheres (having diameters of about 200 angstroms units) stuck together in clumps or chains. Such an assembly of spheres will have overall dimensions of about 0.1 micron. Collection of the product may be accomplished by cooling the gas stream and passing the gas stream through agglomerator columns. Cyclone separators will provide more effective separation, however.

One other advantage to the burner in this application is its role as a flame arrester. Even with these fairly energetic combustible mixtures, there is no possibility of flashback. The burner system can also be scaled up indefinitely with confidence, since each small area of burner surface "sees" the same operating conditions. Increase to 10 or 100 times the 81 cm.² size employed in tests of the device will produce no difference in behavior nor in the silica generated.

What I claim as new and desire to secure by Letters Patent of the United States is:

1. In the process for preparing finely divided silica in which a combustible gaseous mixture of hydrogen, a gas containing molecular oxygen and a halosilane is burned to produce silicon dioxide and hydrogen halide, while heat is simultaneously removed from the system, the improvement comprising:

(a) feeding the combustible gaseous mixture through an internally cooled porous plug burner mounted in the inverted position to the combustion surface thereof at a controlled flow velocity below the normal burning velocity of the gaseous mixture, said porous plug burner functioning as a flame arrester and being made of sintered particles of a metal having a thermal conductivity of at least 5% of the value of the thermal conductivity of copper shot, (b) burning the gaseous mixture as a flame covering and adjacent said combustion surface and simultaneously circulating coolant through said plug burner to maintain the temperature of said flame substantially below the adiabatic value whereby an aerosol comprising silica and a hydrogen halide is produced below said combustion surface, and (c) cooling and collecting the silica so produced.

2. The improvement recited in claim 1 wherein the flame temperature is controllably maintained in the range of from about 1000° C. to about 1200° C.

3. The improvement recited in claim 1 wherein the perimeter of the flame and the resulting burned gas flow is laterally confined by a gaseous flow directed in the generally downward direction.

4. The improvement recited in claim 1 wherein the temperature of the coolant is kept low enough to avoid the condensation of water on the combustion surface.

5. The improvement recited in claim 1 wherein the finely divided silica generated has surface area of less than 300 square meters/gram.

References Cited

UNITED STATES PATENTS

| 3,105,742 | 10/1963 | Allen et al. | 23—202 V |
| 3,121,641 | 2/1964 | Wikswo et al. | 23—202 V X |
| 3,391,997 | 7/1968 | Holland, Jr. | 23—182 V |

FOREIGN PATENTS

| 726,250 | 3/1955 | Great Britain | 23—182 V |

EDWARD STERN, Primary Examiner

U.S. Cl. X.R.
423—335, 481, 277